June 5, 1951 — V. S. DANIELSON — 2,555,398
FRICTION SHOCK ABSORBING MECHANISM FOR RAILWAY DRAFT RIGGINGS
Filed Feb. 10, 1949 — 2 Sheets-Sheet 1

Inventor:
Vernon S. Danielson.
By Henry Fuchs.
Atty.

June 5, 1951
V. S. DANIELSON
2,555,398
FRICTION SHOCK ABSORBING MECHANISM
FOR RAILWAY DRAFT RIGGINGS
Filed Feb. 10, 1949
2 Sheets-Sheet 2
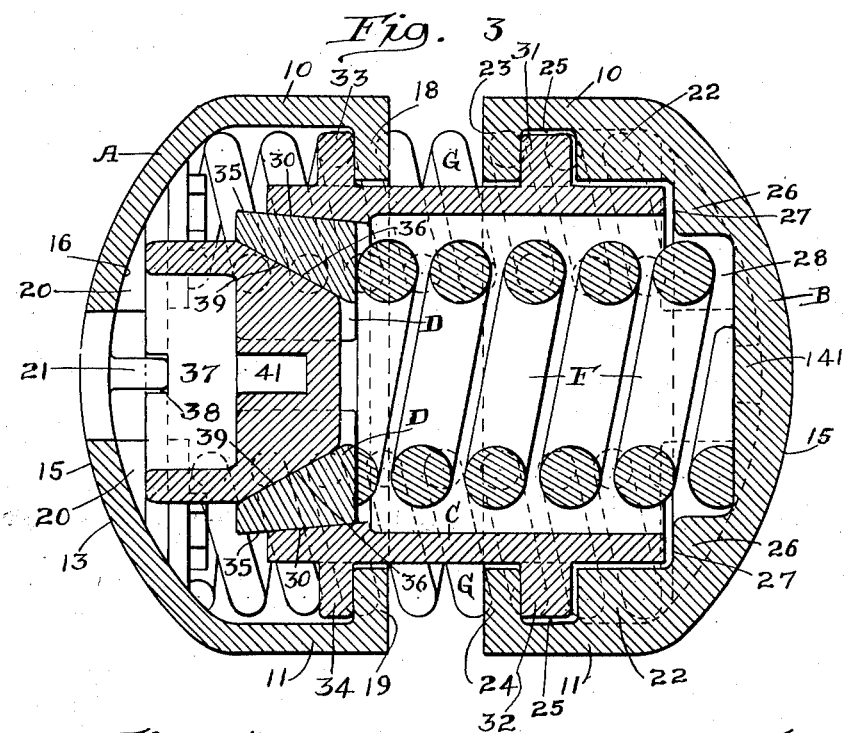
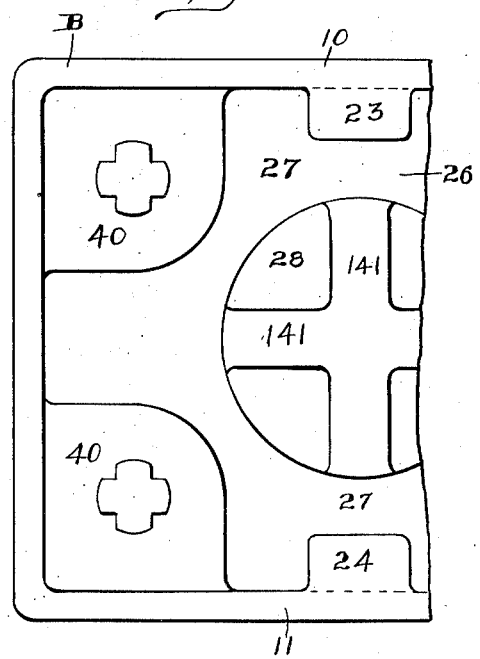
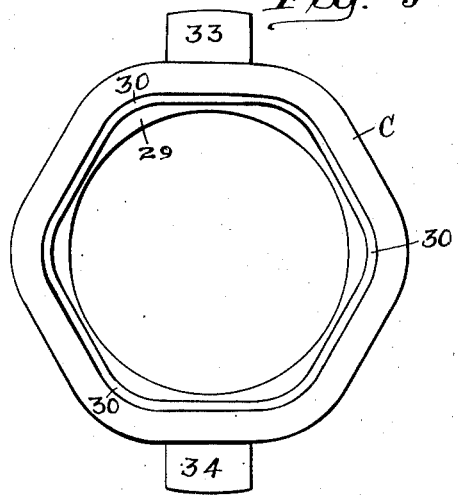
Inventor:
Vernon S. Danielson
By
Henry Fuchs.
Atty.

Patented June 5, 1951

2,555,398

UNITED STATES PATENT OFFICE 2,555,398

FRICTION SHOCK ABSORBING MECHANISM FOR RAILWAY DRAFT RIGGINGS

Vernon S. Danielson, Dolton, Ill., assignor to W. H. Miner, Inc., Chicago, Ill., a corporation of Delaware Application February 10, 1949, Serial No. 75,517

6 Claims. (Cl. 213—23)

This invention relates to improvements in friction shock absorbing mechanisms adapted for use in connection with railway cars and locomotives provided with relatively short draft rigging pockets.

One object of the invention is to provide a friction shock absorbing mechanism of the character indicated, having high shock absorbing capacity, comprising a friction shell, friction shoes slidingly telescoped within the shell, a pressure transmitting wedge member for spreading the shoes apart into tight frictional engagement with the interior of the shell and forcing the shoes inwardly of said shell, a follower at one end of the mechanism bearing on the wedge member, spring means within the shell yieldingly opposing inward movement of the friction shoes, a second follower at the other end of the mechanism, said followers being relatively movable toward and away from each other, and additional spring means opposing relative movement of the followers toward each other, wherein the followers are in the form of casings enclosing the parts of the mechanism, and have shouldered engagement with the friction shell to limit lengthwise separation of the followers and hold the parts of the mechanism assembled.

A further object of the invention is to provide a mechanism as set forth in the preceding paragraph, wherein the spring means, which resists movement of the friction shoes inwardly of the friction shell, also yieldingly opposes relative movement of the shell and corresponding follower toward each other to provide for preliminary spring action to absorb the lighter shocks to which the mechanism is subjected in service.

Other objects of the invention will more clearly appear from the description and claims hereinafter following.

Figure 1:
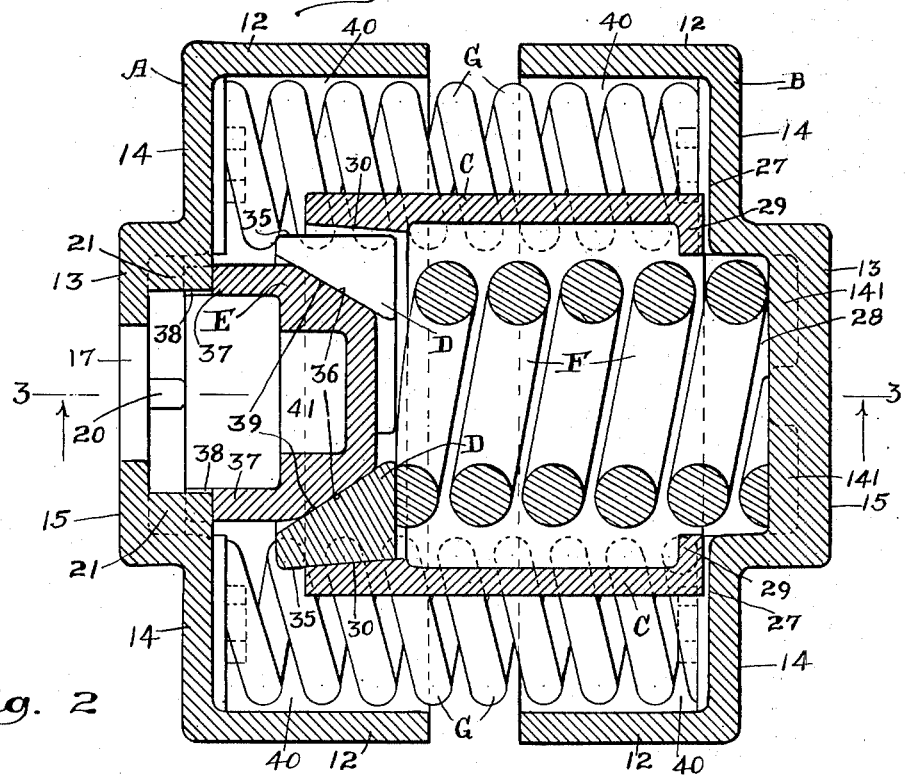
Figure 2:
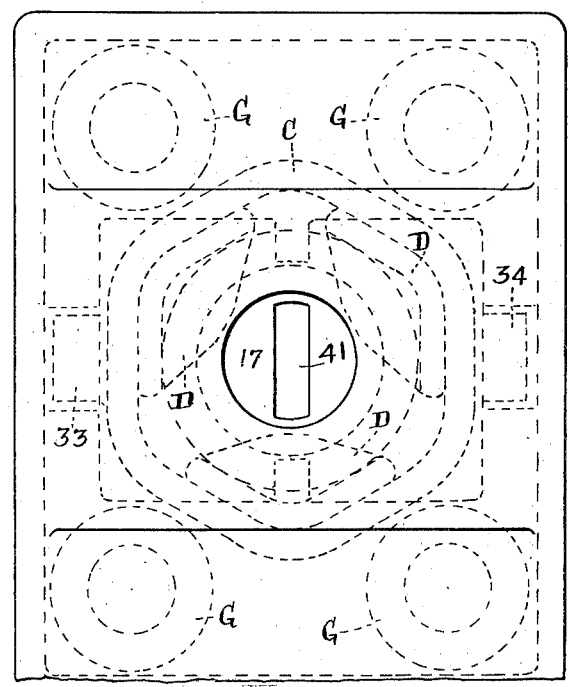
Figure 6:
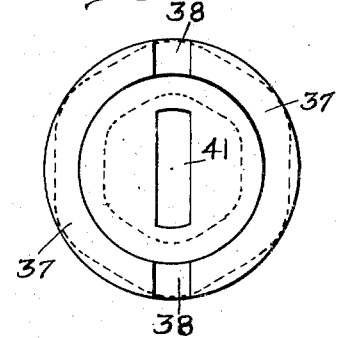

In the accompanying drawings forming a part of this specification, Figure 1 is a horizontal, longitudinal sectional view of my improved friction shock absorbing mechanism. Figure 2 is an end elevational view, looking from left to right in Figure 1. Figure 3 is a longitudinal, vertical sectional view, corresponding substantially to the line 3—3 of Figure 1. Figure 4 is a broken, elevational view of the rear follower casing of my improved mechanism, looking from left to right in Figure 3. Figure 6 is an end elevational view of the friction shell, looking from left to right in Figure 3. Figure 6 is an end elevational view of the wedge member, looking from left to right in Figure 1.

My improved friction shock absorbing mechanism, as illustrated in the drawings, comprises broadly a front follower casing A; a rear follower casing B; a friction shell C; three friction shoes D—D—D; a wedge block E; a spring resistance F within the shell C opposing inward movement of the shoes, and also opposing relative movement of the shell and rear follower casing toward each other to a limited extent; and additional sets of springs G—G and G—G contained within the follower casings and yieldingly opposing movement of said casings toward each other.

The improved friction shock absorbing mechanism illustrated in the drawings is contained in the usual draft gear pocket of the underframe structure of a railway locomotive or car, provided with front and rear stop shoulders or lugs, not shown, and is actuated by the usual yoke which supports the improved shock absorbing mechanism within the draft gear pocket between the front and rear stop lugs in the usual well-known manner for transmitting draft and buffing forces thereto.

The front and rear follower casings A and B of my improved shock absorbing mechanism are of similar design, except as hereinafter pointed out, each being in the form of a rectangular box-like member, open at its inner end and having spaced, horizontally disposed, top and bottom walls 10 and 11, spaced vertical side walls 12—12, and a transverse, vertically extending, outer end wall 13. The outer end wall 13 presents vertically disposed, substantially flat abutment or stop faces 14—14 on the outer side at opposite sides thereof, adapted to cooperate with the stop lugs, not shown, at the corresponding end of the draft gear pocket. The wall 13 is rounded, or vertically curved, between the stop faces 14—14, as shown in Figure 3, thus presenting an outer rounded surface 15. The surface 15 of each follower casing cooperates with the inner side of the corresponding end of the yoke, not shown, of the draft mechanism of the car, which inner side is correspondingly rounded to swivel thereon. The inner surface 16 of the end wall 13 of the follower casing A, which casing is located at the left hand end of the mechanism, as shown in Figures 1 and 3, is vertically rounded or concave on its inner side, as illustrated in Figure 3. The wall 13 of the casing A has a central opening 17 of circular outline, extending therethrough and adapted to admit a suitable tool in the form of a bar (not shown) used in assembling the mechanism. At the inner or open end, the casing A is provided with a pair of centrally disposed, inturned top and bottom stop lugs 18 and 19, the lug 18 depending from the top wall 10 and the lug 19 upstanding from the bottom wall 11 of said casing. The outer end wall 13 of the casing A is formed with vertically and horizontally disposed ribs 20 and 21 on its inner side, projecting from the rounded surface 16 of said wall, the vertical ribs 20—20 being disposed above and below the opening 17 and the horizontal ribs 21—21 at opposite sides of the same. The ribs 20—20 serve as abutments for the outer end of the wedge E and the ribs 21—21, which project inwardly beyond the ribs 20—20, as shown most clearly in Figure 3, serve as locking elements for holding the wedge against rotation, as hereinafter pointed out.

The casing B, which is located at the right hand end of the mechanism, as shown in Figures 1 and 3, is provided with lengthwise extending, relatively heavy, central ribs 22—22, projecting from the inner sides of the top and bottom walls 10 and 11 thereof, these ribs being longitudinally aligned with the lugs 18—18 of the casing A and terminating short of the open inner end of the casing B. The casing B is further provided with a pair of centrally disposed, inturned, top and bottom stop lugs 23 and 24 at its open end, the lug 23 depending from the wall 10 and the lug 24 upstanding from the wall 11. The stop lugs 23 and 24 are longitudinally aligned with the ribs 22—22, in spaced relation to the latter, to provide openings 25—25 therebetween. The wall 13 of the casing B is inwardly thickened, as indicated at 26 in Figures 3 and 4, to provide a vertical abutment face 27. This thickened portion is cut out centrally of the casing to provide a pocket or seat 28 of circular outline, adapted to accommodate the corresponding end of the spring resistance F.

The friction shell C is of hexagonal, transverse cross section, as shown in Figures 2 and 5, and is open at its front and rear ends. The shell C is arranged centrally between the side walls 12—12 and 12—12 of the casings A and B in laterally spaced relation to said walls, thus providing spring pockets 40—40 at opposite sides of each casing. At the rear or right hand end thereof, as shown in Figures 1 and 3, the shell C has an inturned, annular flange 29 defining a circular opening through which the spring resistance F extends. At the front or left hand end thereof, the shell C is provided with three interior, inwardly converging friction surfaces 30—30—30 of V-shaped, transverse cross section, each surface 30 being formed by two of the diverging adjacent walls of the hexagonal shell. As shown in Figures 1 and 3, the rear or right hand end of the shell C cooperates with the abutment faces 27 of the casing B, being normally slightly spaced from said faces, as seen in Figures 1 and 3. Top and bottom stop lugs 31 and 32, projecting into the openings 25—25 in back of the lugs 23 and 24 of the casing B, are provided on the rear or right hand end portion of the shell C, the lugs 31 and 32 being normally engaged in back of the lugs 23 and 24 to limit movement of the shell C to the left with respect to the casing B and hold the shell assembled with said casing. The front end of the shell C projects into the front follower casing A and has its front end normally spaced from the wall 13 of said casing, as shown in Figures 1 and 3. Top and bottom stop lugs 33 and 34 engaged in back of the lugs 18 and 19 of the casing A are provided at the front or left hand end portion of the shell C, as seen in Figure 3, to limit rearward or movement to the right of the shell with respect to the follower casing A.

The friction shoes D, which are three in number, are slidingly telescoped within the left hand end of the shell C, as seen in Figures 1 and 3. Each shoe D has a friction surface 35 of V-shaped, transverse cross section on the outer side engaging one of the V-shaped surfaces 30 of the shell C. Each shoe presents a wedge face 36 of V-shaped, transverse cross section on its inner side. The wedge faces 36—36—36 of the three shoes converge inwardly of the shell C.

The wedge E is in the form of a block having a cylindrical bearing flange 37 at its forward or left hand end, bearing on the ribs 20—20 of the casing A. The flange 37 is notched at diametrically opposite sides, thus providing seats 38—38 within which the horizontally disposed ribs 21—21 of the casing A are engaged to lock the wedge E against rotation with respect to said casing.

At the inner end, the wedge E presents three rearwardly converging, exterior wedge faces 39—39—39 of V-shaped, transverse cross section, correspondingly inclined to and engaging, respectively, with the V-shaped wedge faces 36—36—36 of the shoes D—D—D.

The main body portion of the wedge E is further provided with a transversely extending slot 41 at the front end thereof, adapted to receive a flat bladelike tool member for turning the wedge in assembling the same with the other parts of the mechanism.

The spring resistance F is in the form of a heavy helical coil arranged within the shell C and projecting through the open rear end of the same and into the spring seat 28 of the casing B. The spring F has its front and rear ends bearing, respectively, on the inner ends of the shoes D—D—D and cross ribs 141—141 in the seat 28.

The springs G—G and G—G are contained within the pockets 40—40 and 40—40 of the casings A and B, being arranged in pairs at opposite sides of the friction shell C. The springs G—G and G—G bear at opposite ends on the inner sides of the end walls of the casings A and B and yieldingly oppose relative approach of said casings.

In assembling the mechanism, the casing B is placed on end in upright position on a suitable support. With the casing B in this position, the rear end of the friction shell C is telescoped within the casing B, turned to such a position that the lugs 31 and 32 pass to one side of the lugs 23 and 24 of said casing. The springs G—G and G—G and the spring F are next placed in position in the pockets 40—40 of the casing B and in the shell C, the rear end of the spring F being engaged within the seat 28 of the casing B. The shoes D—D—D together with the wedge E, are then placed on top of the spring F. The casing A is then engaged over the springs G—G—G—G and the wedge E and the shell C, aligned and in registering position with the casing B so that the lugs 18 and 19 of the casing A will pass the lugs 33 and 34 of the shell C when the mechanism is compressed. As will be evident, when the parts are thus positioned, the ribs 21—21 of the casing A rest on the flange 37 of the wedge E to one side of the seats or notches 38—38 of said flange.

The mechanism is then compressed to a sufficient extent to move the lugs 18 and 19 of the casing A to a point below the lugs 33 and 34 of the shell C. While the mechanism is held thus compressed, the wedge E is turned, by a suitable bladelike tool inserted through the opening 17 of the casing A and engaged within the slot 41, to register the seats 38—38 of the wedge with the ribs 21—21 of the casing A and engage the lugs 33, 34, and 31, 32 of the shell C in back of the lugs 18 and 19 and the lugs 23 and 24 of the casings A and B, the shell C being rotated with the wedge E, due to the interlocked engagement of the V-shaped wedge faces of the wedge and shoes and the V-shaped friction surfaces of the shoes and shell. The mechanism is then permitted to expand, seating the ribs 21—21 in the notches or seats 38—38 of the wedge, thereby locking the parts against relative rotation, with the lugs of the friction shell longitudinally aligned with the lugs of the casings A and B.

The operation of my improved friction shock absorbing mechanism is as follows: Upon compression of the mechanism, the follower casings A and B are moved relatively toward each other, thereby compressing the springs G—G and G—G and moving the wedge E inwardly of the follower B. Due to the wedging action between the wedge E and the shoes D—D—D, the latter are spread apart, forcing the same into tight frictional engagement with the friction surfaces of the shell C. During the first part of the compression of the mechanism, the shell C will be forced inwardly to a slight extent, with respect to the casing B, due to the static friction existing between the shoes and shell, thereby compressing the spring F in unison with the springs G—G and G—G. As compression of the mechanism continues, the clearance between the rear end of the shell C and the abutment face 27 of the casing B, and between the lugs 31 and 32 of the shell C and the outer ends of the ribs 22—22 of the casing B, will be taken up, thereby arresting movement of the shell C with respect to the casing B and forcing the friction shoes to slide inwardly of the shell against the resistance of the spring F. Thus, high frictional resistance is provided during the remainder of the compression stroke by sliding movement of the shoes inwardly of the friction shell.

When the actuating force is reduced, the parts are returned to the normal positions shown in Figures 1 and 3 by the expansive action of the springs G—G—G—G and the spring F, outward movement of the follower casings A and B being limited by engagement of the lugs 18—19 and 23—24 thereof with the lugs 33—34 and 31—32 of the shell C.

I claim:

1. In a friction shock absorbing mechanism, the combination with a follower at one end of the mechanism; of a second follower at the other end of the mechanism, said followers being relatively movable toward and away from each other lengthwise of the mechanism; a friction shell open at opposite ends interposed between said followers; a friction clutch slidingly telescoped within one end of said shell and engaged by said first named follower to be moved in unison therewith toward said second named follower, said shell being normally spaced from said last named follower a predetermined distance for movement toward the same during the first part of the compression stroke, and having its movement with respect to said second named follower arrested by engagement with the same during the remainder of the compression stroke; a spring within the shell buttressed against said second named follower and yieldingly opposing movement of said clutch toward said second named follower; and additional springs exterior to said shell, arranged at opposite sides thereof, in abutment with said follower respectively, and yieldingly opposing inward movement of said followers toward each other.

2. In a friction shock absorbing mechanism, the combination with a friction shell open at opposite ends; of a friction clutch slidingly telescoped within one end of the shell; a follower at said end of the shell engaged with said clutch for moving the same inwardly of the mechanism; a second follower at the other end of the shell with which said last named end of the shell is engageable to arrest movement of said shell toward said follower, said followers being relatively movable toward and away from each other lengthwise of the mechanism; a spring reacting between said clutch and said second named follower and normally holding the shell spaced from said second named follower a distance less than the full compression stroke of the mechanism; and additional springs exterior to said shell, bearing on said followers respectively, and yieldingly opposing relative movement of said followers.

3. In a friction shock absorbing mechanism, the combination with a follower at one end of the mechanism; of a second follower at the other end of the mechanism, said followers being relatively movable toward and away from each other lengthwise of the mechanism; a friction shell open at opposite ends; friction shoes slidable within one end of said shell; a spring bearing at one end on the inner ends of said shoes, said spring having the other end thereof extending through the other end of said shell and bearing on said second named follower; a wedge block in wedging engagement with the shoes and actuated by said first named follower; and additional springs exterior to said shell and bearing at opposite ends on said followers for yieldingly opposing movement of the same toward each other.

4. In a friction shock absorbing mechanism, the combination with a follower at one end of the mechanism; of a second follower at the other end of the mechanism, said followers being relatively movable toward and away from each other lengthwise of the mechanism; a friction shell open at opposite ends interposed between said followers, said shell having shouldered engagement with said followers, respectively, to limit relative lengthwise separation of said followers; a friction clutch slidingly telescoped within one end of said shell, said clutch being engaged and actuated by said first named follower; a spring within the shell extending through the other end thereof and bearing at opposite ends on said clutch and second named follower; and additional springs exterior to said shell yieldingly opposing movement of said followers toward each other.

5. In a friction shock absorbing mechanism, the combination with a follower casing at one end of the mechanism having retaining lugs at its inner end; of a second follower casing at the other end of the mechanism having retaining lugs at its inner end, said follower casings being relatively movable toward and away from each other lengthwise of the mechanism; a friction shell open at opposite ends, said shell having retaining lugs at opposite ends thereof engageable with the lugs of said casings to limit movement of said casings outwardly away from said shell; a friction clutch slidingly telescoped within one end of the shell, said clutch being engaged by said first named follower casing to be actuated thereby; a spring within the shell bearing at opposite ends on said second named follower casing and friction clutch, respectively; and springs exterior to said shell interposed between said follower casings and yieldingly opposing movement of the same toward each other.

6. In a friction shock absorbing mechanism, the combination with a pair of follower casings relatively movable toward and away from each other lengthwise of the mechanism, each of said casings having a transverse end wall at its outer end and diametrically opposite, inturned retaining lugs at its inner end, said lugs of said two casings being in longitudinal alignment; a locking projection on the inner side of the end wall of one of said casings; a friction shell open at opposite ends interposed between said casings; friction shoes slidingly telescoped within one end of the shell, said shoes and shell having interengaged friction surfaces holding the shell and shoes against relative rotation; a wedge block, said block and shoes having interengaged wedge faces holding said block against rotation with respect to the shoes, said block bearing on the follower casing which has the locking projection thereon, said block being notched to receive said projection and lock the block against rotation with respect to said last named follower casing; two sets of diametrically opposite, outwardly projecting lugs on said shell at opposite ends thereof engageable in back of the lugs of said casings, respectively, to limit movement of the casings away from each other lengthwise of the mechanism; a spring within the shell yieldingly opposing movement of said shoes inwardly of the shell; and additional springs yieldingly opposing movement of said casings toward each other.

VERNON S. DANIELSON.

REFERENCES CITED

The following references are of record in the file of this patent:

UNITED STATES PATENTS

| Number | Name | Date |
| --- | --- | --- |
| 2,354,826 | Olander | Aug. 1, 1944 |
| 2,439,843 | Dath | Apr. 20, 1948 |